Oct. 1, 1929.   L. ISACHSEN   1,730,076
DEVICE FOR EXTENSION OF THE DISTANCE BETWEEN
AN AUTOMOBILE AND ITS TRAILER
Filed July 1, 1927
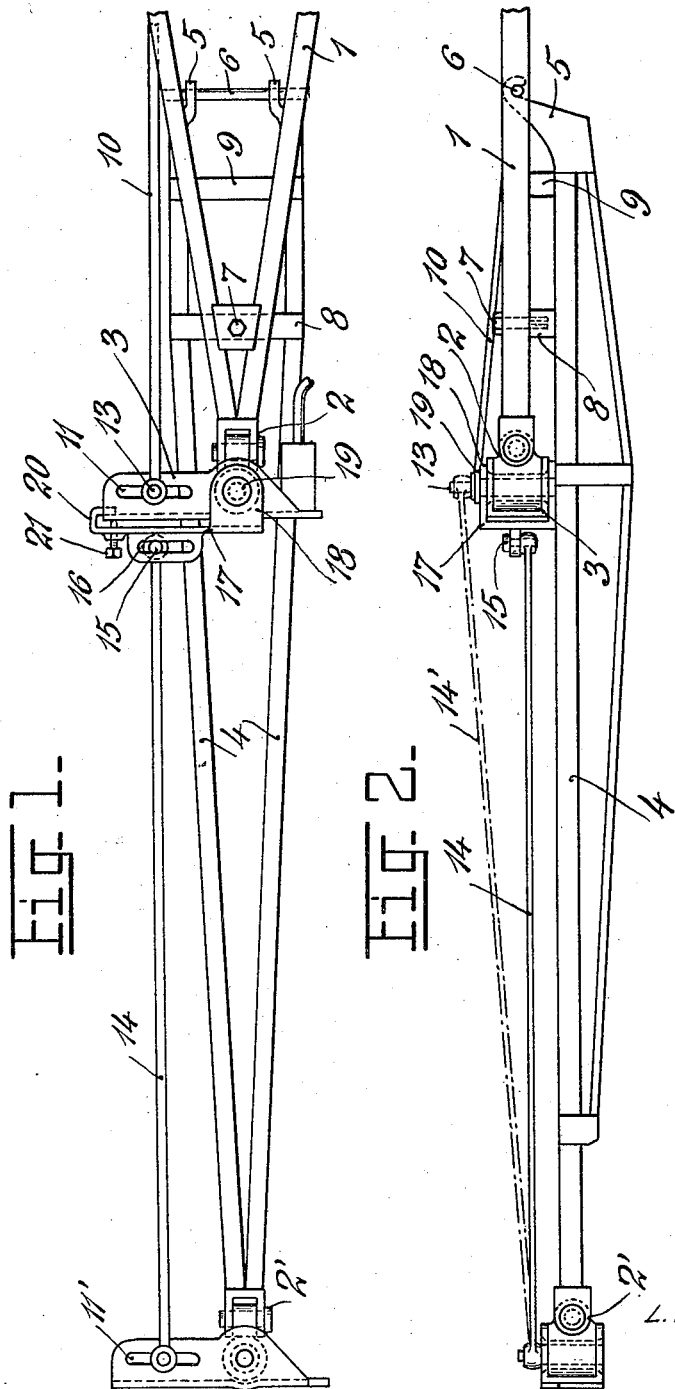
L. Isachsen
INVENTOR Patented Oct. 1, 1929

1,730,076

UNITED STATES PATENT OFFICE

LUDVIK ISACHSEN, OF LARVIK, NORWAY.

DEVICE FOR EXTENSION OF THE DISTANCE BETWEEN AN AUTOMOBILE AND ITS TRAILER

Application filed July 1, 1927, Serial No. 202,930, and in Norway March 12, 1927.

The present invention relates to a device for extension of the distance between an automobile and its trailer.

It is an object of the invention to provide a device by means of which said distance may be easily extended.

Another object is to provide a simple and effective device of the said character which makes it possible to always use a trailer of standard construction.

One embodiment of my invention is illustrated by way of example in the accompanying drawings in which Fig. 1 is a plan view of the apparatus and part of the motor vehicle and the trailer.

Fig. 2 is a side view thereof.

The frame 1 of the trailer is at its front end provided with an universal link 2 and thereby connected to a coupling member 3, by means of which it is normally connected to a mounting on the automobile. An extension frame 4 is at its rear end provided with hooks 5 which from the lower side of the trailer frame 1 may be hooked over a cross bar 6 on the frame 1, and the said frames 1 and 4 may be interconnected by means of a bolt 7, which is inserted through the frame 1 and screwed down into a cross member 8 on the frame 4. Rear to the cross member 8 is situated another cross member 9 or the like, which serves as an abutment against which the frame 1 will be pressed when the bolt 7 is tightened, whereby rattling is avoided. At its front end the frame 4 is by means of an universal links 2' connected to a coupling member 3' by means of which it may be connected to a mounting (not shown) on the automobile.

When the trailer is provided with a steering rod, as shown at 10 on the drawing, which is adjustably mounted in a slot 11 in the coupling member 3 and transfers the steering movements of the automobile to the trailer, also the said rod 10 must be connected to the coupling member 3' of the frame 4. This may be done in a simple manner by securing a rod 14' at its front end to a bolt 12 in a slot 11' in the coupling member 3', and at its rear end to the securing bolt 13 for the steering rod 10. This arrangement is indicated in broken lines in Fig. 2. However, in order that it shall not become necessary to disconnect any of the connections of the trailer when the extension frame is inserted, a rod 14 may be secured to the bolt 12 in the slot 11' and the other end of such rod 14 is secured to a bolt 15 in a slot 16 provided in an extra mounting piece 17, which is in an easily demountable manner secured to the coupling member 3. The mounting piece 17 is in the shape of a plate provided with two rearwardly extended lugs 18 thus forming a channel into which the member 3 may be introduced and secured by means of a bolt passing through holes 18 in the said lugs and the hole for the usual coupling bolt of the coupling member 3. The top portion of the piece 17 is provided with a hook-shaped bend 20 which grasps over the edge of the member 3. By means of a set screw 21 the said bend 20 may be pressed tightly against the member 3.

By means of an extension frame as described the distance between the automobile and its trailer may easily be extended, so that the entire combination may be more conveniently used for transport of extra long objects. By arranging the said extension as a demountable frame is obtained that the weight of the trailer under normal conditions, when such extension need not be used, becomes as little as possible. Further standard construction of the trailer may be always used.

As will be understood the detailed construction may be varied in several ways without departing from the scope of the invention, and the illustrated embodiment of the invention is only intended as a guide for the correct interpretation thereof.

Having now particularly described and ascertained the nature of my said invention and in what manner the same is to be performed, I declare that what I claim is:

1. In a device for extension of the connection between an automobile and the frame and steering rod of a dirigible two wheeled trailer provided with a coupling member adapted to be detachably connected to a coupling member on the automobile, the combination of an extension frame, means for detachably and rigidly connecting said frame and the frame of the trailer, a coupling member secured to the front end of the extension frame similar to the coupling member on the trailer, and a rod connecting the said coupling members adapted to transmit the steering movement of the automobile to the steering rod of the trailer.

2. A device as claimed in claim 1, characterized by the provision of hooks at the rear end of the extension frame adapted to be hooked over a part of the trailer frame, and means connecting the extension and trailer frames at a point in front of the hooks.

3. A device as claimed in claim 1, characterized by the provision of hooks at the rear end of the extension frame adapted to be hooked over a part of the trailer frame, and means connecting the extension and trailer frames at a point in front of the hooks, and abutments between said hooks and the connecting means between the frames, said connecting means including a bolt and means associated therewith for drawing the trailer frame against the abutments.

4. A device as claimed in claim 1, characterized by the provision of means permitting adjustment of the rod relative to the axis of the extension frame.

5. A device as claimed in claim 1, characterized in that the coupling members are provided with slots, and means associated therewith for adjustably mounting the rod in said slots.

In testimony whereof I affix my signature.

LUDVIK ISACHSEN.